(12) United States Patent
Won et al.

(10) Patent No.: US 11,971,889 B2
(45) Date of Patent: Apr. 30, 2024

(54) INTELLIGENT QUERY PLAN CACHE SIZE MANAGEMENT

(71) Applicant: SAP SE, Walldorf (DE)

(72) Inventors: Jaeyeon Won, Cambridge, MA (US); Sung Gun Lee, Seoul (KR); Sanghee Lee, Seoul (KR); Boyeong Jeon, Seoul (KR); Hyung Jo Yoon, Seoul (KR); JunGyoung Seong, Seoul (KR)

(73) Assignee: SAP SE, Walldorf (DE)

( * ) Notice: Subject to any disclaimer, the term of this patent is extended or adjusted under 35 U.S.C. 154(b) by 261 days.

(21) Appl. No.: 17/381,059

(22) Filed: Jul. 20, 2021

(65) Prior Publication Data
US 2023/0021502 A1    Jan. 26, 2023

(51) Int. Cl.
*G06F 16/2453* (2019.01)

(52) U.S. Cl.
CPC .. *G06F 16/24542* (2019.01); *G06F 16/24539* (2019.01)

(58) Field of Classification Search
None
See application file for complete search history.

(56) References Cited

U.S. PATENT DOCUMENTS

| | | | | |
|---|---|---|---|---|
| 2003/0229639 | A1* | 12/2003 | Carlson | G06F 16/24549 |
| 2007/0233638 | A1* | 10/2007 | Carroll | G06F 16/28 |
| 2011/0231389 | A1* | 9/2011 | Surna | G06F 16/24557 |
| | | | | 707/765 |
| 2017/0139991 | A1* | 5/2017 | Teletia | G06F 16/9024 |
| 2017/0337138 | A1 | 11/2017 | Li et al. | |
| 2019/0384845 | A1* | 12/2019 | Saxena | G06F 16/24545 |
| 2020/0050694 | A1* | 2/2020 | Avalani | G06F 16/2455 |
| 2020/0125568 | A1* | 4/2020 | Idicula | G06N 20/20 |
| 2020/0210429 | A1* | 7/2020 | Sinclair | G06F 16/24542 |
| 2020/0379998 | A1* | 12/2020 | Dixit | G06F 16/24542 |
| 2020/0409949 | A1* | 12/2020 | Saxena | G06F 9/505 |
| 2021/0073232 | A1* | 3/2021 | Lee | G06F 16/24542 |
| 2022/0114179 | A1* | 4/2022 | Zheng | G06F 16/24524 |

OTHER PUBLICATIONS

Klaus Aschenbrenner, "How SQL Service executes a query," https://www.sqlpassion.at/archive/2015/08/17/how-sql-server-executes-a-query/, printed Apr. 9, 2021, 8 pages.

(Continued)

*Primary Examiner* — Christopher J Raab
(74) *Attorney, Agent, or Firm* — Klarquist Sparkman, LLP (57) ABSTRACT

A method for intelligent query plan cache size management can be implemented. During execution of a plurality of incoming queries in a database management system, the method can measure actual compilation times of generating query execution plans for the plurality of incoming queries. The database management system can have a query execution plan cache which has a size that can store at least some of the query execution plans. The method can monitor differences between the actual compilation times and ideal compilation times of generating query execution plans for the plurality of incoming queries. The ideal compilation times can be estimated by assuming no query execution plan is evicted from the query execution plan cache. The method can adjust the size of the query execution plan cache based on the monitored differences.

20 Claims, 9 Drawing Sheets

(56) References Cited

OTHER PUBLICATIONS

Beckmann et al., "LHD: Improving Cache Hit Rate by Maximizing Hit Density," https//www.usenix.org/conference/nsdi18/presentation/Beckmann, Proceedings of the 15$^{th}$ USENIX Symposium on Networked Systems Design and Implementation, Renton, WA, Apr. 9-11, 2018, 16 pages.
"Cache Replacement Policies," Wikipedia, https://en.wikipedia.org/wiki/Cache_replacement_policies, printed Mar. 23, 2021, 14 pages.
"Execution Plan Cache Analysis," SQL Service Performance and Tuning, https://guides.peruzal.com/sql-server-performance-tuning-and-optimization/execution-plan-cache-analysis/, printed Apr. 8, 2021, 59 pages.
"Execution Plan Eviction," Execution plan Eviction—SQL Baba, https://www.sqlbaba.com/optimization/execution-plan-eviction/, printed Apr. 8, 2021, 7 pages.
Hameed et al., "Dynamic Cache Management in Multi-Core Architectures through Run-time Adaption," Institute of Space Technology, Conference Paper, Mar. 2021, 7 pages.
Ed Pollack, "Searching the SQL Server query plan cache," https://www.sqlshack.com/understanding-sql-server-query-plan-cache/, SQLShack, printed Mar. 23, 2021, 23 pages.
"Query Plan," Wikipedia, https://en.wikipedia.org/wiki/Query_plan, printed Apr. 13, 2021, 3 pages.
Ben Richardson, "Understanding SQL Server query plan cache," https://www.sqlshack.com/searching-the-sql-server-query-plan-cache/, SQLShack, printed Mar. 23, 2021, 9 pages.
"SQL Server Architecture Explained: Named Pipes, Optimizer, Buffer Manager," https://www.guru99.com/sql-server-architecture.html, printed Apr. 9, 2021, 25 pages.
"What are Hit and Miss Ratios? Learn how to calculate them!" https://wp-rocket.me/blog/calculate-hit-and-miss-ratios/, printed Apr. 8, 2021, 17 pages.
Ding et al., "Reuse Distance Analysis," Technical Report UR-CS-TR-741, Computer Science Department, University of Rochester, Feb. 2001.
"Locality of reference," Wikipedia, https://en.wikipedia.org/wiki/Locality_of_reference, printed Apr. 28, 2021, 6 pages.
"Computer Organization | Locality and Cache friendly code," GeeksforGeeks, https://www.geeksforgeeks.org/computer-organization-locality-and-cache-friendly-code/, printed Apr. 28, 2021, 8 pages.
"Locality of Reference and Cache Operation in Cache Memory," GeeksforGeeks, https://www.geeksforgeeks.org/locality-of-reference-and-cache-operation-in-cache-memory/, printed Mar. 23, 2021, 10 pages.
Extended European Search Report from the European Patent Office for counterpart European Application No. EP22176751.0-1203, dated Oct. 18, 2022, 9 pages.
Hiroaki Kobayashi, "Locality Analysis to Control Dynamically Way-Adaptable Caches," ACM SIGARCH Computer Architecture News, vol. 33, No. 3, Jun. 2005 pp. 25-28.
"Communication—extended European Search Report" from the European Patent Office for European Application No. EP22157250.6-1203, dated Aug. 8, 2022, 10 pages.
"Guide to Tuning SQL Plan Cache—SAP HANA," https://wiki.scn.sap.com/wiki/display/SAPHANA/Guide+to+Tuning+SQL+Plan+Cache, Jan. 15, 2021, pp. 1-3.
"SAP HANA Performance Guide for Developers," Document Version: 1.1, Oct. 31, 2019, pp. 1-256.
Storm et al., "Adaptive Self-Tuning Memory in DB2," Very Lage Data Bases, VLDB Endowment, Sep. 12-15, 2006, pp. 1081-1092.

\* cited by examiner

INTELLIGENT QUERY PLAN CACHE SIZE MANAGEMENT

BACKGROUND

A query plan (also referred to as "query execution plan") is a sequence of steps that a database management system (DBMS), such as a structured query language (SQL) server, executes in order to complete a query. When a query is run for the first time in the DBMS, the query can be compiled to generate a corresponding query plan, which can be stored in memory called "query plan cache," which is also referred to as "query execution plan cache," or simply "plan cache," and these terms can be used interchangeably in any of the examples described herein. Thus, when the same query is run again, the DBMS does not need to regenerate the query plan. Instead, it can reuse the cached query plan stored in the query plan cache, thereby improving efficiency of the DBMS.

The size of query plan cache can be important for the performance of the DBMS. If the size of query plan cache is too big, some of query plan cache space may not be used, leading to a waste of valuable cache memory which otherwise could be used for other purposes. On the other hand, if the size of query plan cache is too small, not all generated query plans can be stored in the query plan cache and some of the query plans have to be evicted from the query plan cache according to certain eviction policies. As a result, when there is an incoming query whose corresponding query plan has been evicted from the query plan cache, that query would have to be complied again, thus leading to a delay of query execution.

Accordingly, there remains a need for an improved system and method for managing the size of a query plan cache in a DBMS.

DETAILED DESCRIPTION

Example 1—Overview of Database Management System

Figure 1:
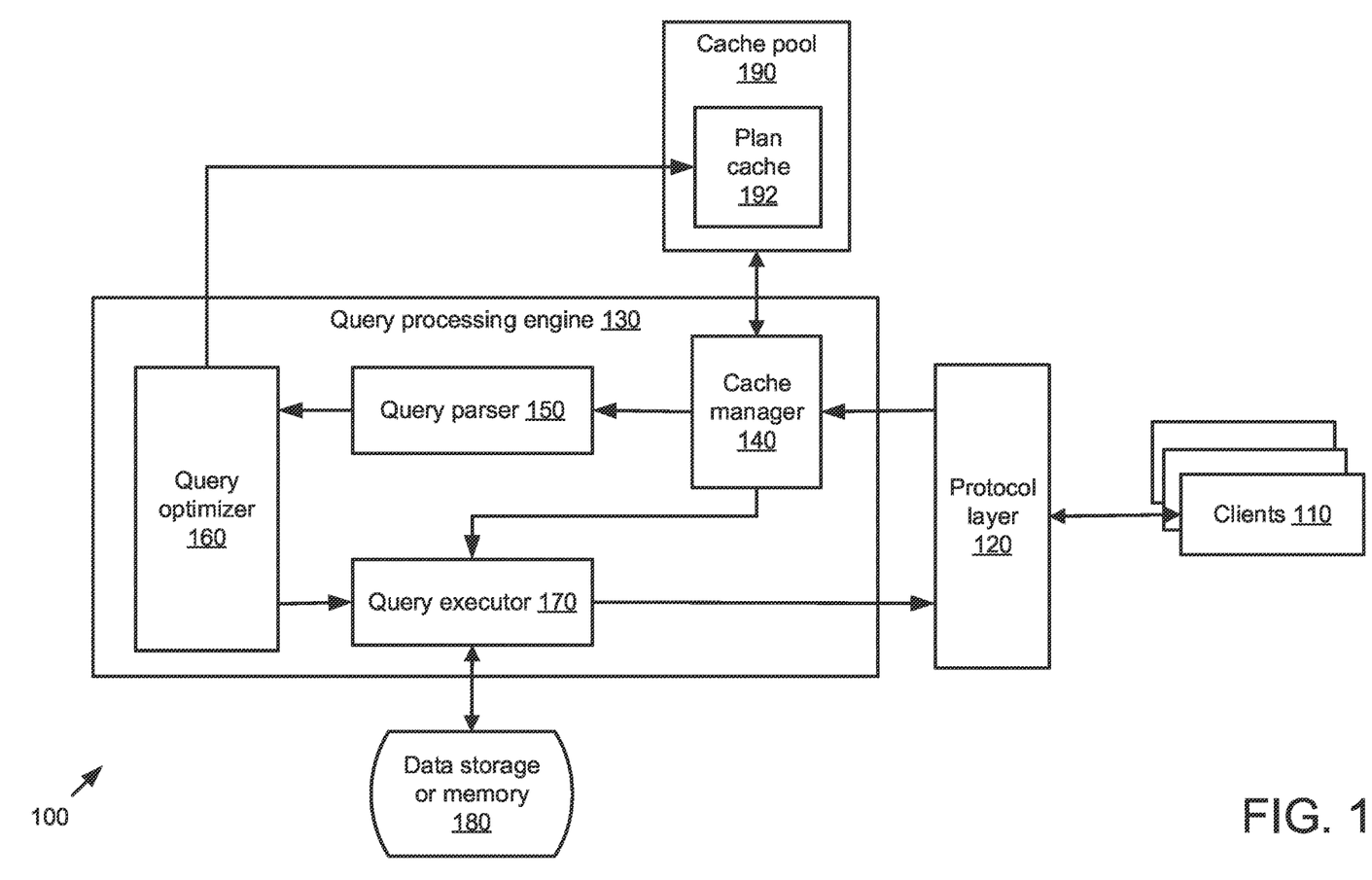
FIG. 1 is an overall block diagram of an example database management system.

FIG. 1 shows an overall block diagram of an example database management system 100 which can implement the intelligent query plan cache size management technology described herein. In an example embodiment, the database management system 100 can be a SQL server.

As shown, the database management system 100 includes a query processing engine 130 and a protocol layer 120 which serves as an interface between one or more clients 110 and the query processing engine 130. For example, the protocol layer 120 can implement a server name indication protocol by which the clients 110 can connect to the query processing engine 130.

The query processing engine 130 can include a cache manager 140, a query parser 150, a query optimizer 160, and a query executor 170. The cache manager 140 can access a cache pool 190, which represents a fast-access memory space. The cache pool 190 can include a plan cache 192 configured to store previously compiled query execution plans, as described below. In certain embodiments, the cache pool 190 can also include a data cache in additional to plan cache 192, wherein the data cache can be configured to keep recent or often-used data in its cache memory which is faster or computationally cheaper to access than normal data storage. The cache pool 190 can be a main memory consumer of the database management system 100 and its size can be configured through Min and Max memory settings.

An incoming query sent from the clients 110 can be evaluated by the cache manager 140 to determine if the query has a corresponding (compiled) query execution plan stored in the plan cache 192.

If the cache manager 140 finds no query execution plan in the plan cache 192 that corresponds to the income query, the incoming query can be analyzed by the query parser 150, which can check if the query contains syntactic and/or semantic errors. After verifying that the incoming query is a valid transactional SQL statement that changes data (e.g., SELECT, INSERT, UPDATE, DELETE, MERGE, etc.), the query parser 150 can generate one or more execution trees in which the query can be run. An execution tree can be used by the query optimizer 160 to generate a corresponding query execution plan, which determines how the query will be executed. The query optimizer 160 can be configured to determine that, among a plurality of query execution plans that are generated based on respective execution trees, which query execution plan is the most optimal or efficient one (e.g., the one that is cheapest in terms of query cost calculated based on CPU usage, memory usage, etc.).

The determined (i.e., most optimal) query execution plan can then be sent to the query executor 170 for execution. The query executor 170 can communicate with a data storage or memory space 180 and execute operators in the query execution plan determined by the query optimizer 170. Data retrieved from the data storage or memory space 180 can be returned to the client 110 via the protocol layer 120.

As described herein, query compilation refers to the process of converting an incoming query to the optimal query execution plan (e.g., checking syntactic and/or semantic errors, generating execution trees, and determining optimal query execution plan), as described above. Depending on the complexity of the query (e.g., the number of joined tables, etc.) and the query optimization algorithm, query compilation time can be long (e.g., tens of seconds or more). Thus, to improve operational efficiency, the compiled query execution plan (i.e., the determined most optimal query execution plan) corresponding to the incoming query can be stored in the plan cache 192 so that it can be quickly retrieved and reused if the same query is submitted again in the future.

For example, if the cache manager 140 determines that the incoming query has a corresponding query execution plan in the plan cache 192, that query execution plan can be fetched directly from the plan cache 192 and forwarded to the query executor 170 for execution. Thus, in this scenario, operations by the query parser 150 and query optimizer 160 can be bypassed. In other words, the incoming query does not need to be recompiled because its previously compiled query execution plan is available in the plan cache 192.

As noted above, the plan cache 192 can store compiled query execution plans. For an incoming query, the cache manager 140 checks if it has a compiled query execution plan stored in the plan cache 192. If yes, then this cached query execution plan can be reused. This can improve efficiency because it eliminates the time of compiling the query (i.e., regenerating the query execution plan). On the other hand, if the query has no compiled query execution plan stored in the plan cache 192, the query has to be compiled. The compiled query can then be stored in the plan cache 192 so that when the same query occurs gain in the future, fast access to its cached query execution plan is feasible. In other words, the plan cache 192 can improve performance by keeping recent or often-used query execution plans in its cache memory which is faster or computationally cheaper to access than normal memory stores.

If the incoming query is new (i.e., a first-time query that has not been submitted before), this new query has no corresponding query execution plan in the plan cache 192 and it must be compiled for the first time. On the other hand, if the incoming query is old (i.e., the same query has been submitted at least once before), whether or not there is a corresponding compiled query execution plan in the plan cache 192 can depend on the size of the plan cache 192 and a plan eviction policy adopted by the cache manager 140.

The plan cache 192 has a limited size. Thus, it may not be able store all compiled query execution plans. When the plan cache 192 approaches its full capacity, certain query execution plans may have to be evicted (i.e., removed) from the plan cache 192 to make room for new ones according to a predefined plan eviction policy (also referred to as "plan eviction algorithm") implemented by the cache manager 140. The efficiency of the eviction policy can be measured by a metric called hit ratio (or hit frequency), which is calculated by dividing the number of cache hits by the total number of cache hits and misses, and it measures how effective a cache is at fulfilling requests for content. As described herein, a cache hit occurs when a query execution plan is requested from a plan cache 192 and the plan cache 192 is able to fulfill that request.

For example, the cache manager 140 can implement a random plan eviction policy which evicts query execution plans from the plan cache 192 in a random manner. In another example, the cache manager 140 can implement the least recently used (LRU) plan eviction policy which removes the least recently used query execution plans first from the plan cache 192. In yet another example, the least frequently used (LFU) plan eviction policy can be used which first evicts the execution policies that are used least often. A further example can be a score-based plan eviction policy. For example, a score for a query execution plan can be calculated as a product of compilation time and hit frequency divided by the size of the query execution plan (i.e., score=compilation time×hit frequency/plan size). A query execution plan with the lowest score can be evicted first (i.e., query execution plans are less likely to be evicted if they take longer time to compile, used more frequently, or have small size). It is to be understood that the above described plan eviction policies are merely illustrative. Many other plan eviction policies can also be used by the cache manager 140.

Different plan eviction policies have their respective advantages and disadvantages. Regardless of eviction policies, the size of plan cache 192 can be a limiting factor. If the size of plan cache 192 is too big, some of plan cache space may not be used, leading to a waste of valuable cache memory which otherwise could be used for other purposes (e.g., for data cache). On the other hand, if the size of plan cache 192 is too small, some of the query execution plans may have to be frequently evicted from the plan cache 192 according to certain eviction policies. As a result, when there is an incoming query whose corresponding query plan has been evicted from the plan cache 192, that query would have to be complied again, thus leading to a decrease in performance.

Thus, it would be advantageous for an improved cache management system that supports more intelligent plan cache size management, and overall, more efficient query operation in a database management system. Such intelligent plan cache size management technologies can be applied across a wide variety of enterprise software environments.

Example 2—Example Intelligent Cache Manager in a DBMS

Figure 2:
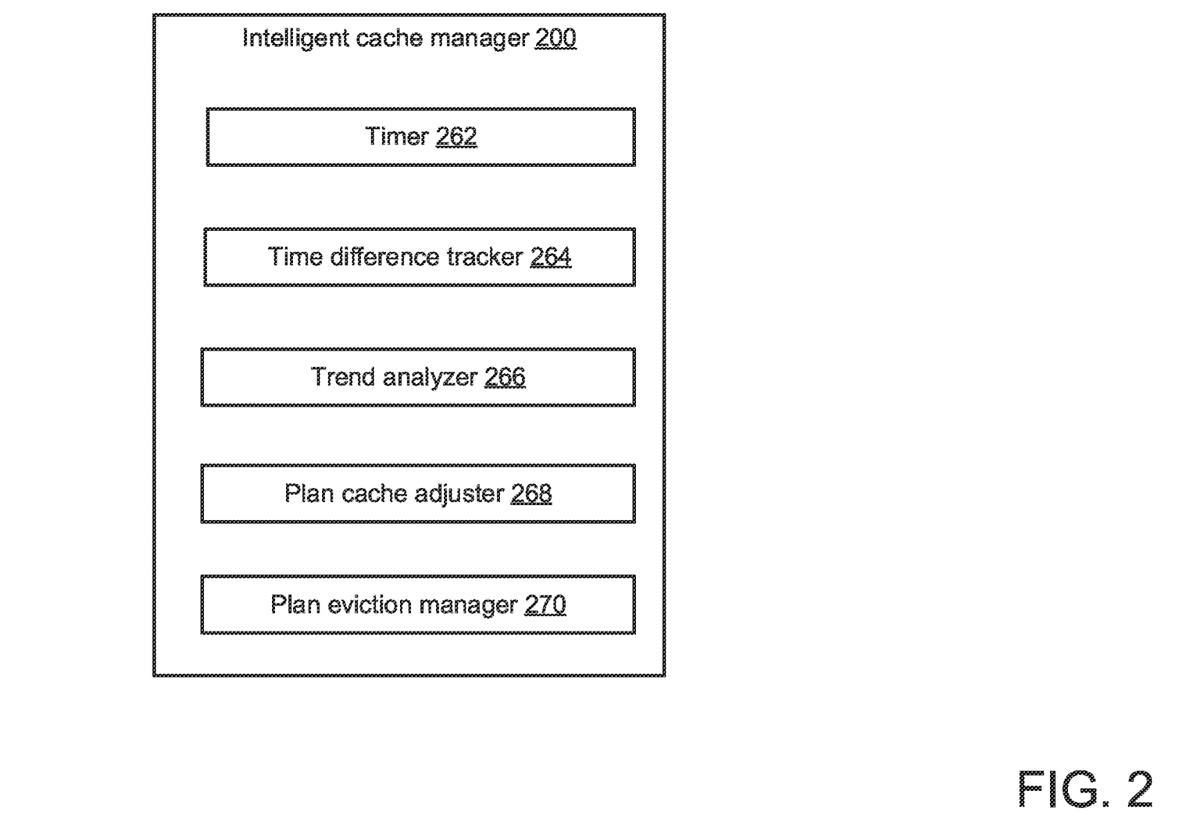
FIG. 2 is a block diagram of an example intelligent cache manager.

FIG. 2 shows a block diagram of an example intelligent cache manager 200 supporting intelligent plan cache size management in a database management system. The intelligent cache manager 200 can be an example embodiment of the cache manager 140 described above.

As shown, the intelligent cache manager 200 can include a timer 262 a time difference tracker 264, a trend analyzer 266, and a plan cache adjuster 268. As described further below, the timer 262 can measure or track the actual compilation time of incoming queries. The timer 262 can also measure or track the elapsed time since a start time (e.g., the time when the database management system was turned ON).

The time different tracker 264 can be configured to monitor a time difference between actual compilation time and ideal compilation time to generate a corresponding (e.g., optimized) query execution plan for an incoming query. As described more fully below, the ideal compilation time for an incoming query can be estimated assuming that no query execution plan is evicted from a plan cache which is assumed to have an unlimited size. The monitored time differences between actual compilation times and ideal compilation times for different incoming queries can be stored in a memory location, which can be within the intelligent cache manager 200, or in a cache space (e.g., 190), or elsewhere.

The trend analyzer 266 can be configured to determine a trend of the monitored differences between the actual compilation times and the ideal compilation times for the incoming queries. The trend can be determined to be flat, nearly flat, or increasing. In certain embodiments, the trend can be measured by a slope of the monitored time differences between actual and ideal compilation times over a previous period of time. In one embodiment, the duration of the previous period of time can be a predefine duration. In another embodiment, the duration of the pervious period of time can be determined as a time period during which a predefined number of incoming queries are submitted by clients.

The plan cache adjuster 268 can be configured to dynamically adjust the size of the plan cache (e.g., 192), based on the monitored differences between the actual compilation times and the ideal compilation times for the incoming queries. As described more fully below, in certain embodiments, the size of plan cache can be increased, e.g., when the monitored time differences has increased to a certain extent over a previous period of time. In certain embodiments, the size of plan cache can be decreased, e.g., when the monitored time difference has remained relatively flat over a previous period of time. In certain embodiments, the increase and/or decrease of the plan cache size can be adaptive to the slope of the monitored time differences. Increasing the plan cache size can be achieved by allocating an extra cache or memory space to the plan cache (e.g., repurposing a portion of the cache pool 190 outside the plan cache 192 to plan cache 192). Decreasing the plan cache size can be achieved by removing a portion of the plan cache (e.g., releasing a portion of the plan cache 192 to the cache pool 190).

In practice, the systems and subsystems shown herein, such as system 100 and intelligent cache manager 200, can vary in complexity, with additional functionality, more complex components, and the like. For example, there can be additional functionality within the cache manager 140 or 260. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems/subsystems described herein can be implemented in conjunction with any of the hardware components described herein, such as the computing systems described below (e.g., processing units, memory, and the like). In any of the examples herein, the compilation time, the monitored time differences, the trend and/or slope of monitored time differences, the increase and/or decrease of plan cache size, and the like can be stored in one or more computer-readable storage media or computer-readable storage devices. The technologies described herein can be generic to the specifics of operating systems or hardware and can be applied in any variety of environments to take advantage of the described features.

Figure 3:
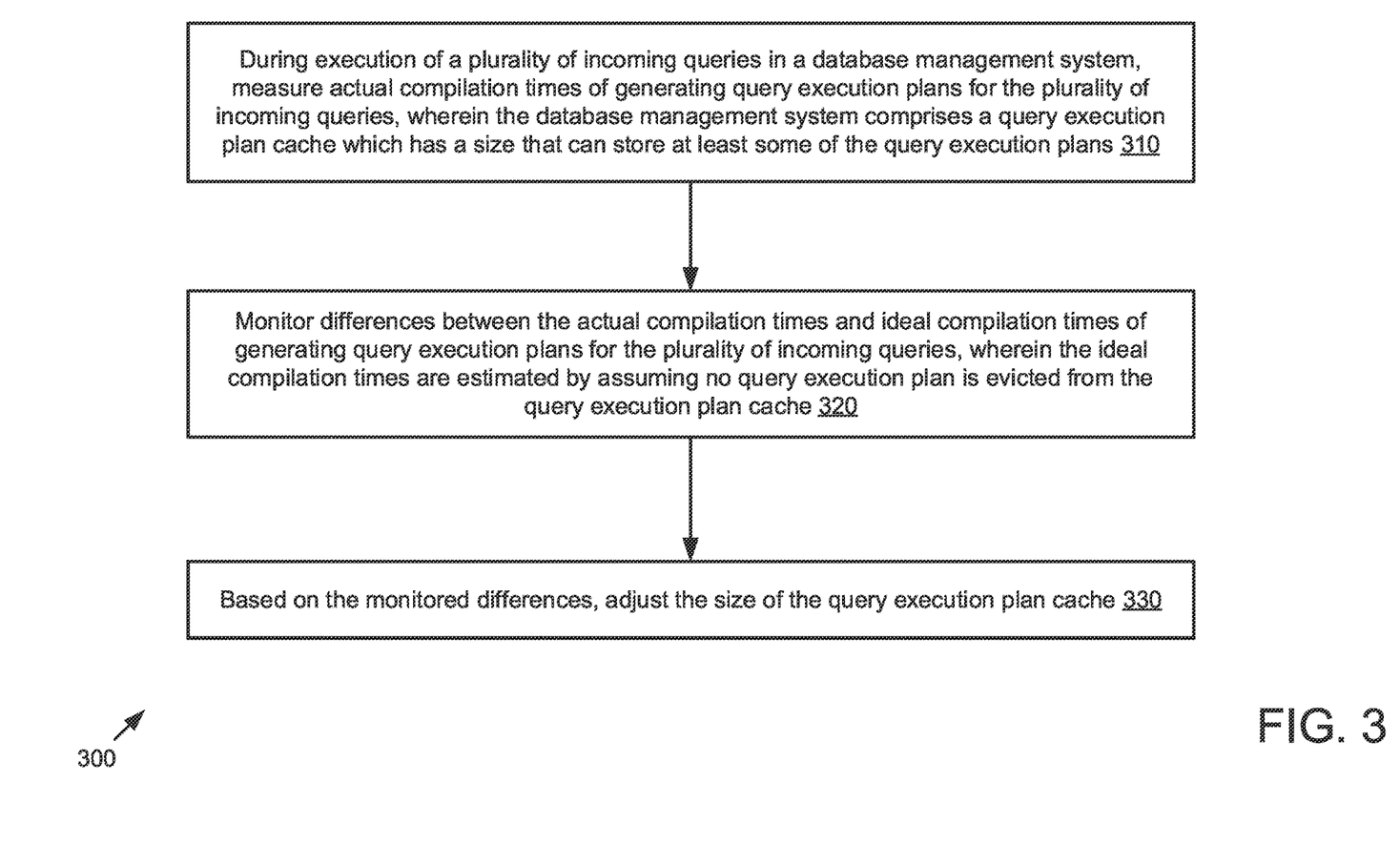
FIG. 3 is a flowchart illustrating an example overall method of intelligent query plan cache size management.

Example 3—Example Overall Method of Intelligent Query Plan Cache Size Management FIG. 3 is a flowchart 300 of an example overall method of implementing intelligent query plan cache size management and can be performed, for example, by the system of FIG. 1, or more specifically, by the cache manager 140 or 260.

At 310, the method can, during execution of a plurality of incoming queries in a database management system, measure actual compilation times of generating query execution plans for the plurality of incoming queries. The database management system can include a query execution plan cache which has a size that can store at least some of the query execution plans. In certain embodiments, measuring the compilation times of incoming queries can be performed by a timer (e.g., 262) of the cache manager.

At 320, the method can monitor differences between the actual compilation times and ideal compilation times of generating query execution plans for the plurality of incoming queries. As described herein, the ideal compilation times can be estimated by assuming that no query execution plan is evicted from the query execution plan cache. This can occur in an ideal situation where the size of the query execution plan cache is assumed to be unlimited.

Estimation of ideal compilation times can be implemented by measuring time saved from not compiling old queries. For example, if an incoming query is new, this new query must be compiled for the first time, even if the size of the query execution plan cache is unlimited. Thus, the ideal compilation time will increase by the amount of time to compile this new query. But if the incoming query is old, its previously compiled query execution plan must exist in the query execution plan cache because, in the ideal situation, it has an unlimited size and never evicts any query execution plan. As a result, this old query does not need to be recompiled, and the ideal compilation time will remain unchanged. In other words, the time to recompile the old query is saved in the ideal situation. Thus, the ideal compilation time establishes a floor or minimum compilation time that is possible to compile the incoming queries. Any measured actual compilation time will be either the same as the ideal compilation time (when no eviction of query execution plan occurs) or larger than the ideal compilation time (when eviction of query execution plan occurs).

In certain embodiments, differences between the actual compilation times and the ideal compilation times for the plurality of incoming queries can be monitored by a time difference tracker (e.g., 264) of the cache manager. In addition, differences between the actual compilation times and the ideal compilation times for the plurality of incoming queries can be stored in a memory location, which can be in the cache manager (e.g., 140 or 260), or the cache pool (e.g., 190), or elsewhere.

Then at 330, based on the monitored differences, the method can adjust the size of the query execution plan cache. In certain embodiments, a trend analyzer (e.g., 266) in the cache manager can be used to determine a trend of the monitored time differences for a period of time. The determined trend of the monitored time differences can be received by a plan cache adjuster (e.g., 268), which can dynamically increase and/or decrease the size of the query execution plan cache accordingly, as described more fully below.

The method described in the flowchart 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Figure 4:
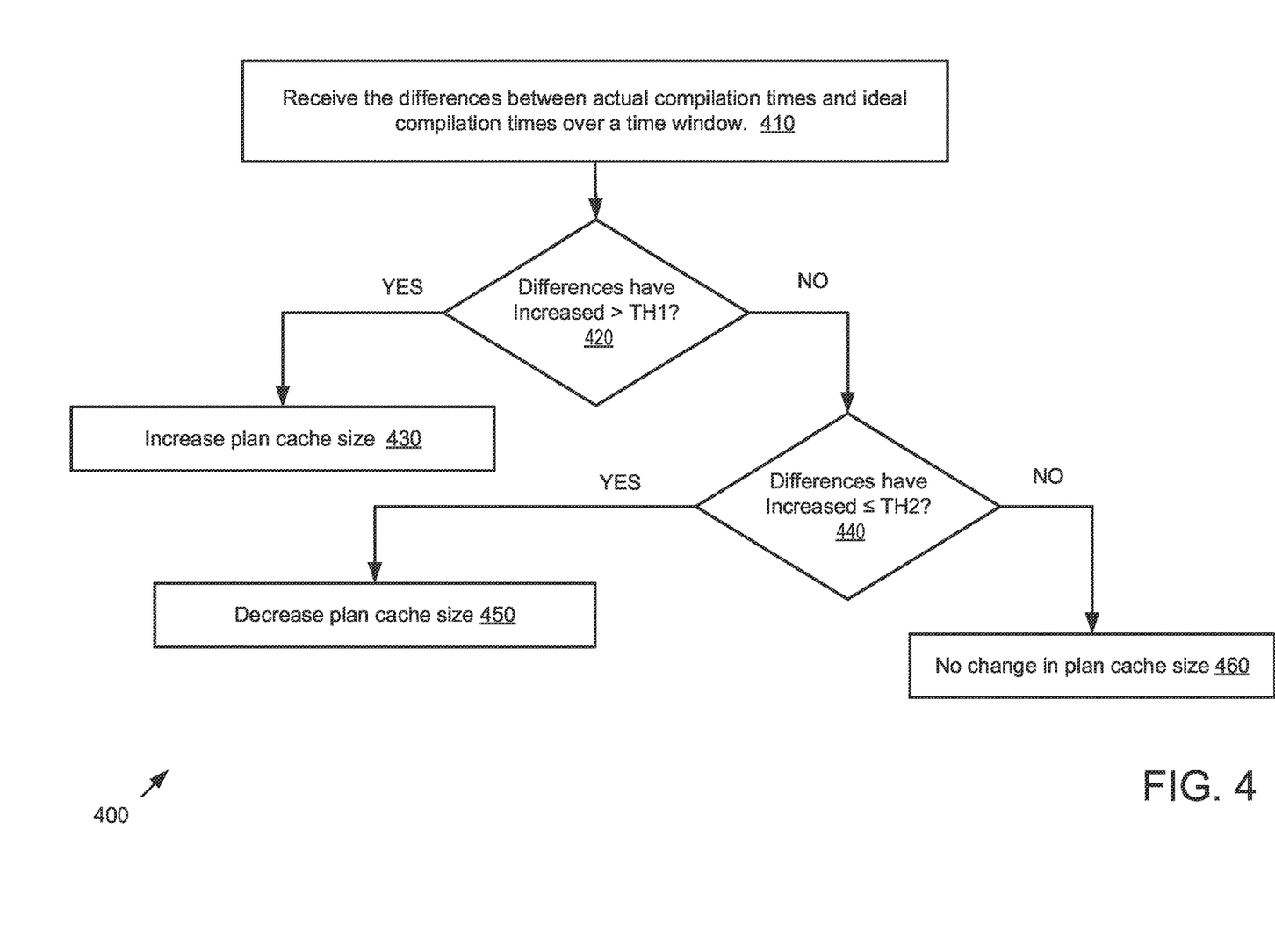
FIG. 4 is a flowchart illustrating a method for dynamically adjusting query plan cache size based on differences between actual and ideal compilation times.

Example 4—Example Method for Dynamically Adjusting Query Plan Cache Size Based on Differences Between Actual and Ideal Compilation Times FIG. 4 shows a flowchart 400 of an example method for dynamically adjusting the size of a query execution plan cache based on monitored differences between actual and ideal compilation times for a plurality of incoming inquiries. As noted above, the method can be implemented by a plan cache adjuster (e.g., 268), in conjunction with a trend analyzer (e.g., 266) in the cache manager.

As shown, at 410, the method can receive the monitored differences between actual compilation times and ideal compilation times over a previous time window. In one embodiment, the previous time window can have a predefined duration (e.g., one second, ten seconds, one minute, etc.). In another embodiment, the previous time window can correspond to a time duration when a predetermined number of incoming queries (e.g., 1,000 queries, 5,000 queries, 10,000 queries, etc.) are executed.

The monitored time differences over the previous time window can then be evaluated. For example, at 420, a condition check can be performed to determine if the monitored time differences over the previous time window have increased to such an extent that the increase in time differences has exceeded a first threshold (TH1), which can be a predefined value (e.g., twenty seconds, one minute, etc.). If yes, the method can branch to 430 to increase the plan cache size. If no, the method can perform another condition check at 440 to determine if the monitored time differences over the previous time window has no or only a limited increase. For example, the method can compare the increase in time differences with a second threshold (TH2), which can also be a predefined value (e.g., one second, ten seconds, etc.). Generally, the second threshold (TH2) is the same as or smaller than the first threshold (TH1), i.e., TH2≤TH1. If yes, it can be determined that the increase in time differences in the previous time window is negligible or the time differences between actual and ideal compilation time is nearly flat, and the method can branch to 450 to decrease the plan cache size. Otherwise, the method can branch to 460 where no change in plan cache size occurs.

In a special case where TH1=TH2, the step 460 is not performed. In other words, the condition check at 440 is not needed (since it is redundant to the condition check at 420), and the plan cache size can either increase at 430 or decrease at 450.

In another special case where TH1=0, any increase in time differences in the previous time window can lead to an increase of the plan cache size at 430.

In yet another special case where TH2=0, the method can decrease the plan cache size at 450 only when there has been no increase in time differences over the previous time window (i.e., the time differences between actual and ideal compilation times remain flat).

While in the depicted flowchart 400, the condition check 420 is performed before the condition check 440, it is to be understood that in alternative embodiments, the condition check 420 can be performed after the condition check 440.

In certain embodiments, evaluation of the time differences (e.g., the condition checks 420 and 440) can be performed in continuous, non-overlapping time windows. For example, the evaluation can be performed after every minute (or other predefined durations), or after every 1,000 queries (or other predefined number of queries). In other embodiments, evaluation of the time differences (e.g., the condition checks 420 and 440) can be performed in continuous, overlapping time windows. The degree of overlap between adjacent time windows can be predefined. For example, a first time window may correspond to a time period from 0 to 60 seconds, a second time window may correspond to a time period from 1 to 61 seconds (i.e., with 1 second overlap), and so on. Similar, a first time window may correspond to a time window which includes queries 1-1000, a second time window may correspond to a time window which includes queries 11-1011 (i.e., with an overlap of 10 queries), etc.

Example 5—Example Methods for Determining Amount of Increment or Decrement of Query Plan Cache Size In any of the examples herein, plan cache size can be increased by allocating an extra cache or memory space to the plan cache (e.g., allocating an extra cache space in the cache pool 190 to the plan cache 192), or decreased by removing a portion of the plan cache (e.g., releasing a portion of the plan cache 192 to the cache pool 190).

In any of the examples herein, the increase and/or decrease of the plan cache size can be constrained within predefined maximum and/or minimum plan cache size limits. In certain embodiments, the maximum and/or minimum plan cache size limits can be fixed values. In certain embodiments, the maximum and/or minimum plan cache size limits can be configured to be adaptive to the size of a cache pool (e.g., 190). For example, the increase of the plan cache size can be limited by a maximum cache size that has a fixed value (e.g., 1 GB, 2 GB, 10 GB, etc.), or a predefined percentage (e.g., 50%, 60%, 75%, etc.) of the size of the cache pool. Similarly, the decrease of the plan cache size can be limited by a minimum cache size that has a fixed value (e.g., 10 MB, 100 MB, 200 MB, etc.), or a predefined percentage (e.g., 10%, 20%, 25%, etc.) of the size of the cache pool.

In any of the examples herein, the amount of increase or decrease of the plan cache size can be fixed. For example, to increase the plan cache size, an extra cache of a predefined size (e.g., 1 MB, 10 MB, 25 MB, etc.) can be added to the plan cache. Likewise, to decrease the plan cache size, a cache portion having a predefined size (e.g., 1 MB, 10 MB, 25 MB, etc.) can be removed from the plan cache.

In any of the examples herein, the amount of increase or decrease of the plan cache size can be adaptive or proportional to the current plan cache size (i.e., the size the plan cache before such increase or decrease). For example, to increase the plan cache size, an extra cache whose size is a predefined percentage (e.g., 0.5%, 1%, 2%, etc.) of the current plan cache size can be added to the plan cache. Likewise, to decrease the plan cache size, a cache portion whose size is a predefined percentage (e.g., 0.5%, 1%, 2%, etc.) of the current plan cache size can be removed from the plan cache.

In any of the examples herein, the amount of increase or decrease of the plan cache size can be adaptive or proportional to a difference between a predefined size limit and the current plan cache size. For example, to increase the plan cache size, an extra cache can be added to the plan cache, wherein the size of the extra cache can be a predefined fraction (e.g., ¼, ⅓, ½, etc.) of the difference between the maximum cache size (as described above) and the current plan cache size. Likewise, to decrease the plan cache size, a cache portion can be removed from the plan cache, wherein the size of the cache portion can be a predefined fraction (e.g., ⅛, ⅕, ¼, etc.) of the difference between the current plan cache size and the minimum cache size (as described above).

In any of the examples herein, the amount of increase or decrease of the plan cache size can be adaptive or proportional to a size of a query execution plan stored in the plan cache (also referred to as a "reference query plan"). For example, to increase the plan cache size, an extra cache can be added to the plan cache, wherein the size of the extra cache can be proportional to (e.g., 50%, 100%, 200%, etc.) the size of the reference query plan. Likewise, to decrease the plan cache size, a cache portion can be removed from the plan cache, wherein the size of the cache portion can be proportion to (e.g., 50%, 100%, 150%, etc.) the size of the reference query plan. In certain embodiments, the query execution plan which has been last stored in the plan cache can be selected as the reference execution plan. In other embodiments, the reference query plan can be selected based on other criteria. For example, the reference query plan can be selected to be the oldest query execution plan, the largest query execution plan, the query execution plan associated with the most compilation time, or query plan associated with the highest (or lowest) hit ratio, and so on.

In any of the examples herein, a slope of the monitored time differences between actual and ideal compilation times over the previous time window can be measured, e.g., by the trend analyzer 266. In certain embodiments, the slope can be measured as a ratio of the total increase in time difference in the previous time window to the duration of the previous time window. Alternatively, the slope can be measured as a ratio of the total increase in time difference in the previous time window to the total number of incoming queries in the previous time window.

Similar to the condition checks 420 and 440 in FIG. 4, the size of the plan cache can be increased if the measured slope is greater than a predefined first threshold (i.e., the slope is positive), or decreased if the measured slope is zero or smaller than a predefined second threshold, wherein the second threshold is smaller than or equal to the first threshold. In certain embodiments, the amount of increase of the plan cache size can be adaptive or proportional to the measured slope. For example, the larger the measured slope, the larger increase of the plan cache size.

Figure 5:
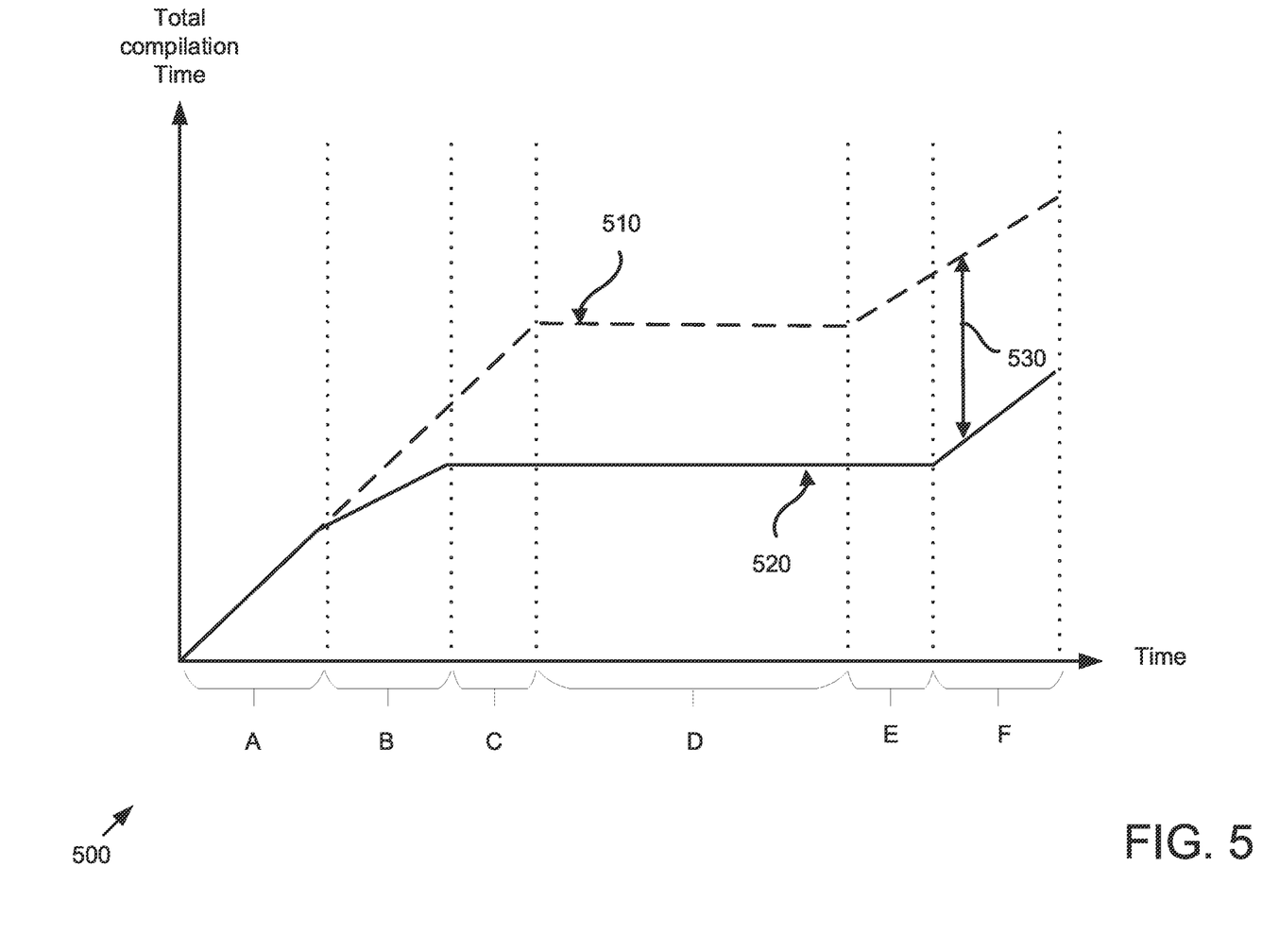
FIG. 5 is an example plot of actual compilation time and ideal compilation time accumulated for some incoming queries.
Figure 6:
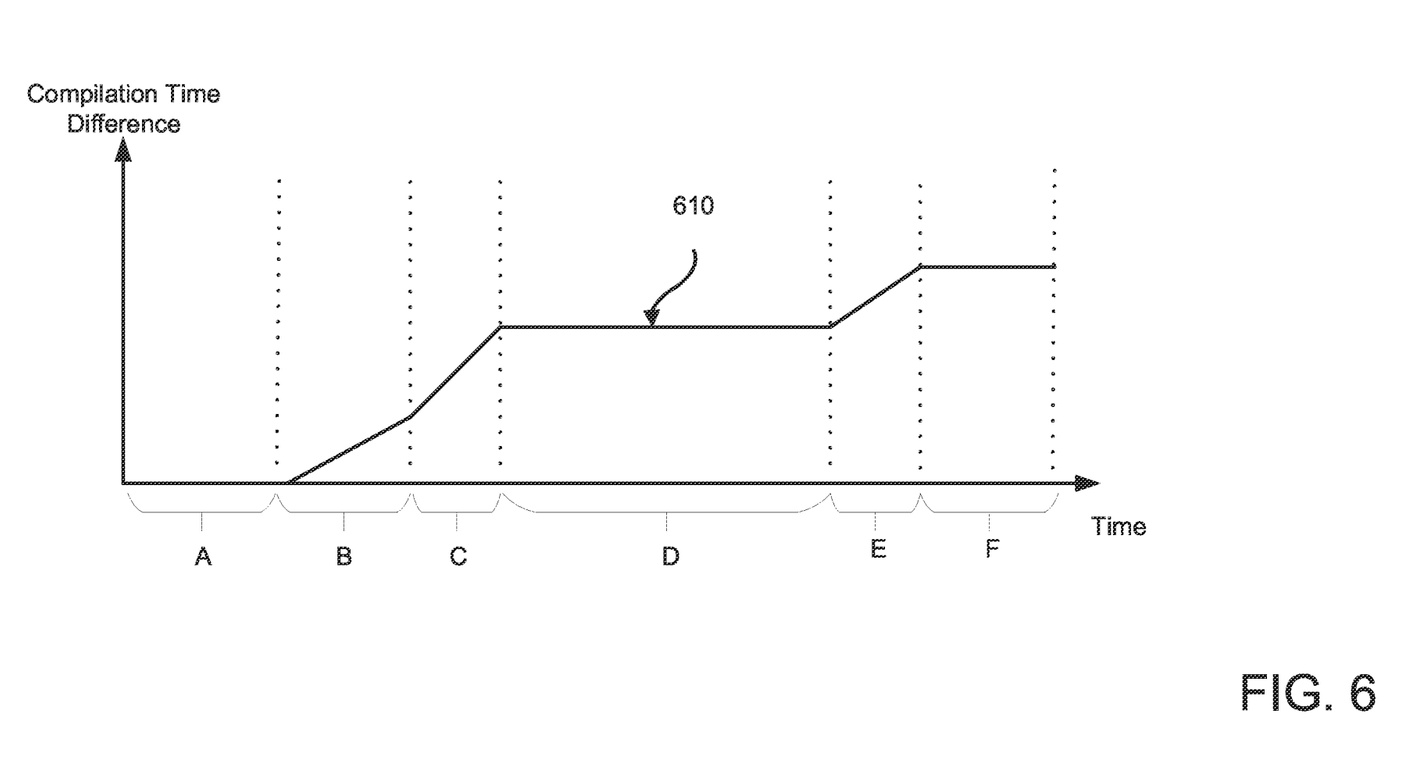
FIG. 6 is an example plot of compilation time difference between actual and ideal compilation times depicted in FIG. 5.
Figure 7:
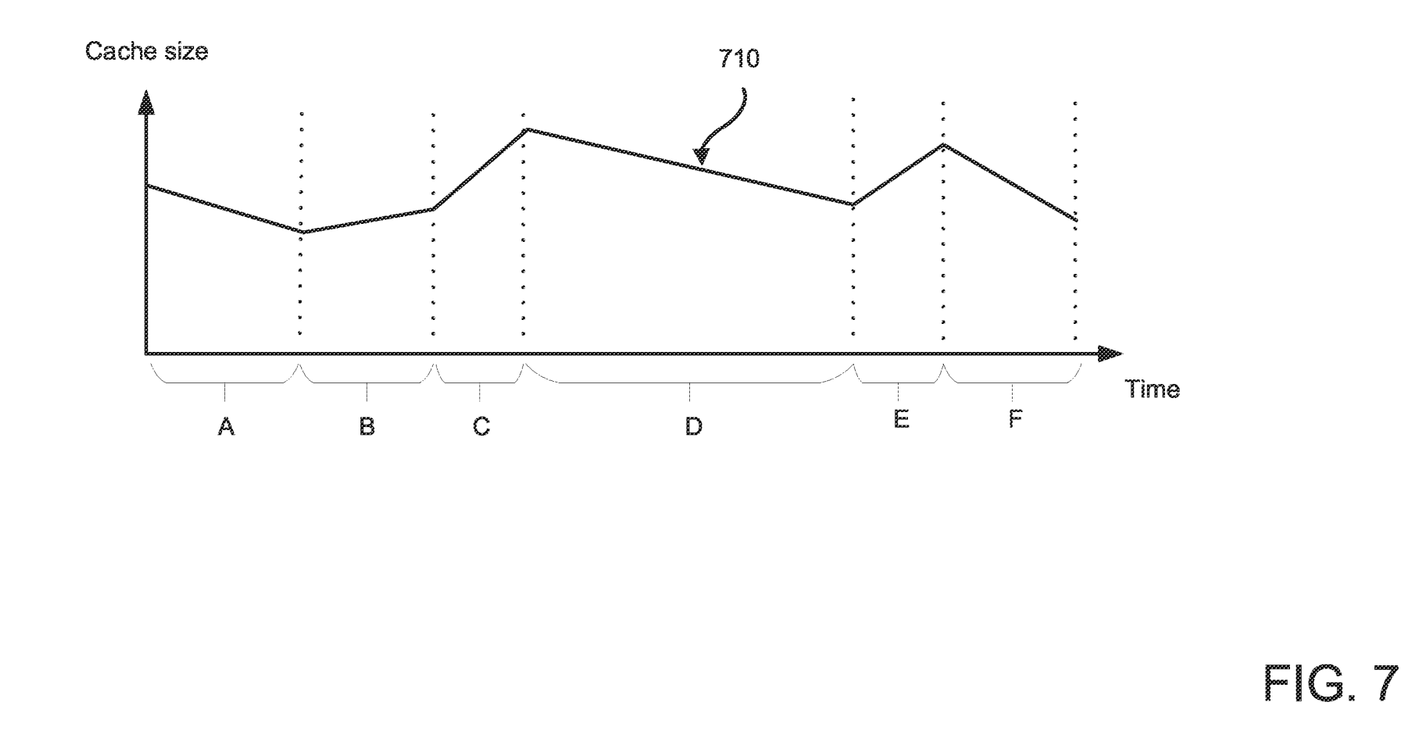
FIG. 7 is an example plot of varying query plan cache size corresponding to the incoming queries depicted in FIG. 5.

Example 6—Example Uses Cases Illustrating Dynamic Adjustment of Query Plan Cache Size Example use cases are described below, in reference to FIGS. 5-7, to further illustrate the method of intelligent query plan cache size management described above. It is to be understood that FIGS. 5-7 are merely for illustrative purposes and are not necessarily drawn to scale. For example, the length and/or slope of certain segments described below can vary from what are depicted in the figures. In addition, some of the linear segments shown in FIGS. 5-7 can have nonlinear shapes.

FIG. 5 schematically shows an example plot 500 of actual compilation time 510 (shown in a dashed line) and ideal compilation time 520 (shown in a solid line) accumulated for some incoming queries. The displayed x-axis is the run time when incoming queries are submitted. Alternatively, the x-axis can refer to the number of incoming queries. The y-axis is the total compilation time (i.e., accumulated compilation time) of incoming queries.

The actual compilation time 510 can be obtained by measuring accumulated compilation time for the incoming queries. The actual compilation time 510 will depend on the implemented plan eviction policy. For example, the actual compilation time 510 will increase if there is a new query which has to be compiled for the first time, or if an old query has no corresponding query execution plan stored in the plan cache (i.e., the previously compiled query execution plan was evicted from the plan cache according to the implemented plan eviction policy). On other hand, the actual compilation time 510 will remain flat if an old query has a corresponding query execution plan stored in the plan cache so that the query does not need to be recompiled. As noted above, the ideal compilation time 520 can be estimated by assuming that no query execution plan is evicted from the query execution plan cache. Thus, while a new query still needs to be compiled for the first time, an old query will not be compiled again.

In the depicted example, the run time (or incoming queries) can be divided into six segments A, B, C, D, E, and F. In segments A and F, all incoming queries are new. Thus, these queries must be compiled for the first time before their executions, whether there is an implemented plan eviction policy or there is no eviction of query execution plan. The actual compilation time 510 and the ideal compilation time 520 will either overlap with each other (e.g., at the beginning in segment A) or their difference 530 will remain constant (e.g., in a later segment F). In segment B, some incoming queries are new and some incoming queries are old. While new queries still need to be compiled, the old queries do not need to be recompiled for the ideal condition (i.e., no plan eviction). However, some of the old queries may need to be recompiled based on the implemented plan eviction policy. As a result, it will cause a divergence of the actual compilation time 510 and the ideal compilation time 520 in segment B. In segments C and E, all incoming queries are old. The ideal compilation time 520 will remain flat because these queries do not need to be recompiled. However, some of the old queries may still need to be recompiled based on the implemented plan eviction policy. As a result, it will lead to a further divergence of the actual compilation time 510 and the ideal compilation time 520 in segments C and E. In segment D, all incoming queries are old, but they all have corresponding query execution plans stored in the plan cache (i.e., no eviction according to the implemented plan eviction policy). Thus, the difference 530 between the actual compilation time 510 and the ideal compilation time 520 will remain constant in segment D.

To illustrate, FIG. 6 plots a curve 610 depicting the compilation time difference 530 between the actual compilation time 510 and the ideal compilation time 520 depicted in FIG. 5. As shown, the compilation time difference 530 remains flat in segments A, D, and F, and increases with varying degrees of slope in segments B, C, and E.

As described above, the intelligent cache manager can be configured to increase the plan cache size if there has been a substantial increase (e.g., the time difference exceeds a predefined first threshold) in time differences between actual and ideal compilation times in the previous time window, or decrease the plan cache size if the time differences between actual and ideal compilation times has remained constant or nearly flat (e.g., the time difference is below a predefined second threshold).

For illustrative purposes, FIG. 7 plots an example curve 710 depicting varying plan cache size corresponding to the incoming queries depicted in FIG. 5. As shown, the plan cache size decreases in segments A, D, and F when the compilation time difference remains flat. In contrast, the plan cache size increases in segments B, C, and E when the time difference between actual and ideal compilation times progressively increases. As noted above, different methods can be selected to determine the amount of increase or decrease of the plan cache size (e.g., the amount of increase or decrease of the plan cache size can be fixed or adaptive to certain metrics). Thus, the slope of the curve 710 in each segment can also vary depending on the method chosen to determine the amount of increase or decrease of the plan cache size.

Thus, when the size of the plan cache is sufficiently large (e.g., in segments A, D, and F) to hold the query execution plans of most incoming queries, the plan cache size can be gradually reduced (e.g., to release cache resource to the cache pool) without negatively affecting the performance of query execution because few query execution plans are evicted from the plan cache. But when the plan cache is significantly reduced (e.g., in segments B, C, and E) such that some incoming queries have to be recompiled because their previously compiled query execution plans were evicted from the plan cache, the plan cache size can be gradually increased so as to reduce or mitigate the negative effect of plan eviction policy.

Example 7—Example Advantages

A number of advantages can be achieved via the technology described herein. For example, the intelligent cache manager can dynamically adjust the cache plan size based on actual need of the plan cache, i.e., increasing or reducing the plan cache size as the need of plan cache increases or decreases, respectively. This is important because the need of plan cache may be unpredictable in the run time and can vary significantly depending on what queries are submitted by clients. As a result, the disclosed technology can continuously find the appropriate (or optimize) the plan cache size in order to maximize the performance of the database management system. The appropriate (or optimized) plan cache size can struck a right balance between query performance and resource management: on one hand, it is not too small to cause frequent evictions of query plans and recompilation of old queries; on the other hand, it is not too big to waste valuable cache memory resources. The intelligent plan cache management technology described herein can be easily deployed to any database management system implementing any query plan eviction policy. In addition, the disclosed method of dynamic adjustment of cache plan size can be performed automatically by the intelligent cache manager without human interaction. Further, such dynamic adjustment of cache plan size can be achieved on the fly or in real-time (e.g., adjustment of the cache plan size can be realized within a fraction of a second after evaluating the time difference in actual and ideal compilation times in a previous time window).

Example 8—Example Computing Systems

Figure 8:
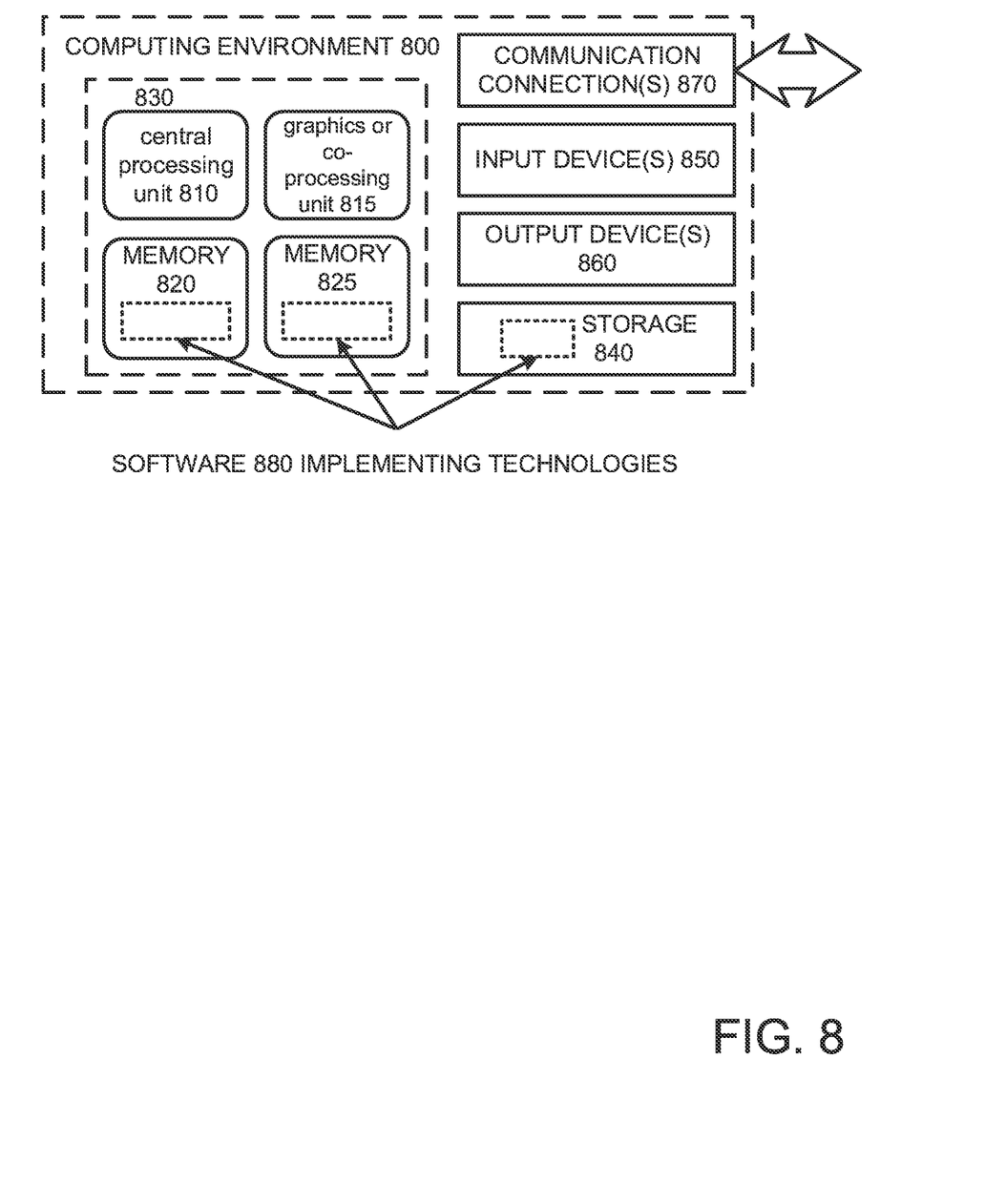
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 can have additional features. For example, the computing system 800 includes storage 840, one or more input devices 850, one or more output devices 860, and one or more communication connections 870, including input devices, output devices, and communication connections for interacting with a user. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 9—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 10—Example Cloud Computing Environment

Figure 9:
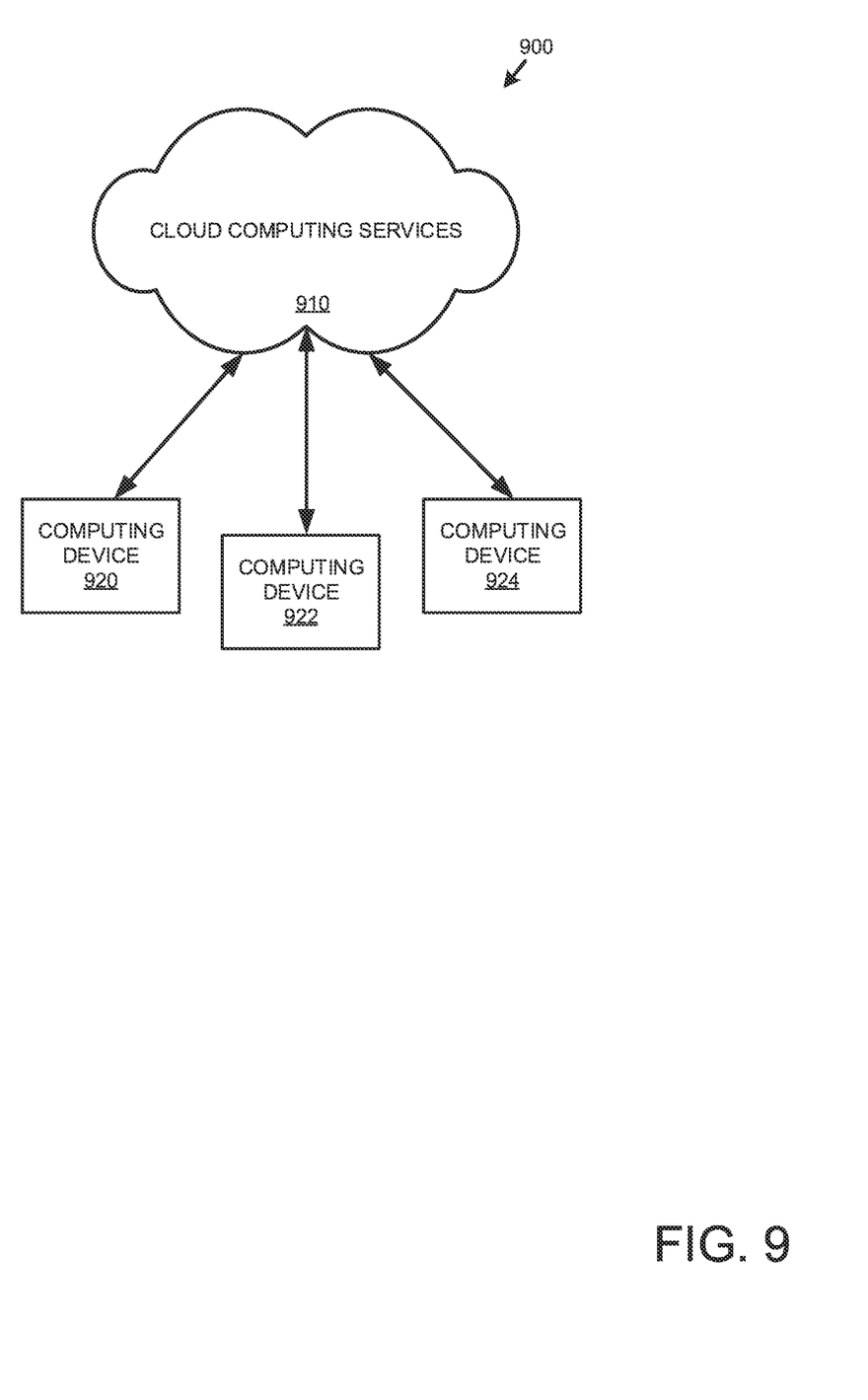
FIG. 9 is a block diagram of an example cloud computing environment that can be used in conjunction with the technologies described herein.

FIG. 9 depicts an example cloud computing environment 900 in which the described technologies can be implemented, including, e.g., the system disclosed above and other systems herein. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 923. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 11—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 12—Example Embodiments

Any of the following embodiments can be implemented.

Clause 1. A computer-implemented method comprising: during execution of a plurality of incoming queries in a database management system, measuring actual compilation times of generating query execution plans for the plurality of incoming queries, wherein the database management system comprises a query execution plan cache which has a size that can store at least some of the query execution plans; monitoring differences between the actual compilation times and ideal compilation times of generating query execution plans for the plurality of incoming queries, wherein the ideal compilation times are estimated by assuming no query execution plan is evicted from the query execution plan cache; and based on the monitored differences, adjusting the size of the query execution plan cache.

Clause 2. The method of clause 1, further comprising storing the differences between the actual compilation times and the ideal compilation times of generating query execution plans for the plurality of incoming queries in a memory location.

Clause 3. The method of any one of clauses 1-2, further comprising determining a trend of the differences between the actual compilation times and the ideal compilation times of generating query execution plans for the plurality of incoming queries.

Clause 4. The method of clause 3, wherein determining the trend comprises determining a slope of the differences in a previous time period, and increasing the size of the query execution plan cache by a step size, wherein the step size is proportional to the slope if the slope is greater than zero.

Clause 5. The method of any one of clauses 1-4, wherein adjusting the size of the query execution plan cache comprises increasing the size of the query execution plan cache if the monitored differences have increased by an amount that is greater than a predefined threshold after executing a predetermined number of incoming queries.

Clause 6. The method of clause 5, wherein increasing the size of the query execution plan cache comprises allocating an extra cache to the query execution plan cache, wherein a size of the extra cache is proportional to a size of a query execution plan which has been lastly stored in the query execution plan cache.

Clause 7. The method of clause 5, wherein increasing the size of the query execution plan cache comprises allocating an extra cache to the query execution plan cache, wherein a size of the extra cache is a predefined fraction of a difference between a predefined maximum cache size and the size of the query execution plan cache before allocating the extra cache.

Clause 8. The method of any one of clauses 1-7, wherein adjusting the size of the query execution plan cache comprises decreasing the size of the query execution plan cache if the monitored differences have not increased by an amount that is greater than a predefined threshold after executing a predetermined number of incoming queries.

Clause 9. The method of clause 8, wherein decreasing the size of the query execution plan cache comprises removing a cache portion out of the query execution plan cache, wherein the cache portion has a predefined size.

Clause 10. The method of clause 8, wherein decreasing the size of the query execution plan cache comprises removing a cache portion out of the query execution plan cache, wherein a size of the cache portion is a predefined percentage of the size of the query execution plan cache before removing the cache portion.

Clause 11. A computing system comprising: memory; one or more hardware processors coupled to the memory; and one or more computer readable storage media storing instructions that, when loaded into the memory, cause the one or more hardware processors to perform operations comprising: during execution of a plurality of incoming queries in a database management system, measuring actual compilation times of generating query execution plans for the plurality of incoming queries, wherein the database management system comprises a query execution plan cache which has a size that can store at least some of the query execution plans; monitoring differences between the actual compilation times and ideal compilation times of generating query execution plans for the plurality of incoming queries, wherein the ideal compilation times are estimated by assuming no query execution plan is evicted from the query execution plan cache; and based on the monitored differences, adjusting the size of the query execution plan cache.

Clause 12. The system of clause 11, wherein adjusting the size of the query execution plan cache comprises increasing the size of the query execution plan cache if the monitored differences have increased by an amount that is greater than a predefined threshold after executing a predetermined number of incoming queries.

Clause 13. The system of clause 12, wherein increasing the size of the query execution plan cache comprises allocating an extra cache to the query execution plan cache, wherein a size of the extra cache is proportional to a size of a query execution plan which has been lastly stored in the query execution plan cache.

Clause 14. The system of clause 12, wherein increasing the size of the query execution plan cache comprises allocating an extra cache to the query execution plan cache, wherein a size of the extra cache is a predefined fraction of a difference between a predefined maximum cache size and the size of the query execution plan cache before allocating the extra cache.

Clause 15. The system of any one of clauses 11-14, wherein adjusting the size of the query execution plan cache comprises decreasing the size of the query execution plan cache if the monitored differences have not increased by an amount that is greater than a predefined threshold after executing a predetermined number of incoming queries.

Clause 16. The system of clause 15, wherein decreasing the size of the query execution plan cache comprises removing a cache portion out of the query execution plan cache, wherein the cache portion has a predefined size.

Clause 17. The system of clause 15, wherein decreasing the size of the query execution plan cache comprises removing a cache portion out of the query execution plan cache, wherein a size of the cache portion is a predefined percentage of the size of the query execution plan cache before removing the cache portion.

Clause 18. The system of any one of clauses 11-17, wherein the operations further comprise determining a trend of the differences between the actual compilation times and the ideal compilation times of generating query execution plans for the plurality of incoming queries.

Clause 19. The system of clause 18, wherein determining the trend comprises determining a slope of the differences in a previous time period, and increasing the size of the query execution plan cache by a step size, wherein the step size is proportional to the slope if the slope is greater than zero.

Clause 20. One or more computer-readable media having encoded thereon computer-executable instructions causing one or more processors to perform a method comprising: during execution of a plurality of incoming queries in a database management system, measuring actual compilation times of generating query execution plans for the plurality of incoming queries, wherein the database management system comprises a query execution plan cache which has a size that can store at least some of the query execution plans; monitoring differences between the actual compilation times and ideal compilation times of generating query execution plans for the plurality of incoming queries, wherein the ideal compilation times are estimated by assuming no query execution plan is evicted from the query execution plan cache; and based on the monitored differences, adjusting the size of the query execution plan cache; wherein adjusting the size of the query execution plan cache comprises increasing the size of the query execution plan cache if the monitored differences have increased after executing a predetermined number of incoming queries and decreasing the size of the query execution plan cache if the monitored differences have remained flat after executing the predetermined number of incoming queries.

Example 13—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
during execution of a plurality of incoming queries in a database management system, measuring actual compilation times of generating query execution plans for the plurality of incoming queries, wherein the database management system comprises a query execution plan cache which has a size that can store at least some of the query execution plans;
monitoring differences between the actual compilation times and ideal compilation times of generating query execution plans for the plurality of incoming queries, wherein the ideal compilation times are estimated by assuming no query execution plan is evicted from the query execution plan cache; and
based on the monitored differences, dynamically adjusting the size of the query execution plan cache in runtime so that the size of the query execution plan cache varies during execution of the plurality of incoming queries.

2. The method of claim 1, further comprising storing the differences between the actual compilation times and the ideal compilation times of generating query execution plans for the plurality of incoming queries in a memory location.

3. The method of claim 1, further comprising determining a trend of the differences between the actual compilation times and the ideal compilation times of generating query execution plans for the plurality of incoming queries.

4. The method of claim 3, wherein determining the trend comprises determining a slope of the differences in a previous time period, and increasing the size of the query execution plan cache by a step size, wherein the step size is proportional to the slope if the slope is greater than zero.

5. The method of claim 1, wherein adjusting the size of the query execution plan cache comprises increasing the size of the query execution plan cache if the monitored differences have increased by an amount that is greater than a predefined threshold after executing a predetermined number of incoming queries.

6. The method of claim 5, wherein increasing the size of the query execution plan cache comprises allocating an extra cache to the query execution plan cache, wherein a size of the extra cache is proportional to a size of a query execution plan which has been lastly stored in the query execution plan cache.

7. The method of claim 5, wherein increasing the size of the query execution plan cache comprises allocating an extra cache to the query execution plan cache, wherein a size of the extra cache is a predefined fraction of a difference between a predefined maximum cache size and the size of the query execution plan cache before allocating the extra cache.

8. The method of claim 1, wherein adjusting the size of the query execution plan cache comprises decreasing the size of the query execution plan cache if the monitored differences have not increased by an amount that is greater than a predefined threshold after executing a predetermined number of incoming queries.

9. The method of claim 8, wherein decreasing the size of the query execution plan cache comprises removing a cache portion out of the query execution plan cache, wherein the cache portion has a predefined size.

10. The method of claim 8, wherein decreasing the size of the query execution plan cache comprises removing a cache portion out of the query execution plan cache, wherein a size of the cache portion is a predefined percentage of the size of the query execution plan cache before removing the cache portion.

11. A computing system comprising:
memory;
one or more hardware processors coupled to the memory; and
one or more computer readable storage media storing instructions that, when loaded into the memory, cause the one or more hardware processors to perform operations comprising:
during execution of a plurality of incoming queries in a database management system, measuring actual compilation times of generating query execution plans for the plurality of incoming queries, wherein the database management system comprises a query execution plan cache which has a size that can store at least some of the query execution plans;
monitoring differences between the actual compilation times and ideal compilation times of generating query execution plans for the plurality of incoming queries, wherein the ideal compilation times are estimated by assuming no query execution plan is evicted from the query execution plan cache; and
based on the monitored differences, dynamically adjusting the size of the query execution plan cache in runtime so that the size of the query execution plan cache varies during execution of the plurality of incoming queries.

12. The system of claim 11, wherein adjusting the size of the query execution plan cache comprises increasing the size of the query execution plan cache if the monitored differences have increased by an amount that is greater than a predefined threshold after executing a predetermined number of incoming queries.

13. The system of claim 12, wherein increasing the size of the query execution plan cache comprises allocating an extra cache to the query execution plan cache, wherein a size of the extra cache is proportional to a size of a query execution plan which has been lastly stored in the query execution plan cache.

14. The system of claim 12, wherein increasing the size of the query execution plan cache comprises allocating an extra cache to the query execution plan cache, wherein a size of the extra cache is a predefined fraction of a difference between a predefined maximum cache size and the size of the query execution plan cache before allocating the extra cache.

15. The system of claim 11, wherein adjusting the size of the query execution plan cache comprises decreasing the size of the query execution plan cache if the monitored differences have not increased by an amount that is greater than a predefined threshold after executing a predetermined number of incoming queries.

16. The system of claim 15, wherein decreasing the size of the query execution plan cache comprises removing a cache portion out of the query execution plan cache, wherein the cache portion has a predefined size.

17. The system of claim 15, wherein decreasing the size of the query execution plan cache comprises removing a cache portion out of the query execution plan cache, wherein a size of the cache portion is a predefined percentage of the size of the query execution plan cache before removing the cache portion.

18. The system of claim 11, wherein the operations further comprise determining a trend of the differences between the actual compilation times and the ideal compilation times of generating query execution plans for the plurality of incoming queries.

19. The system of claim 18, wherein determining the trend comprises determining a slope of the differences in a previous time period, and increasing the size of the query execution plan cache by a step size, wherein the step size is proportional to the slope if the slope is greater than zero.

20. One or more non-transitory computer-readable media having encoded thereon computer-executable instructions causing one or more processors to perform a method comprising:
during execution of a plurality of incoming queries in a database management system, measuring actual compilation times of generating query execution plans for the plurality of incoming queries, wherein the database management system comprises a query execution plan cache which has a size that can store at least some of the query execution plans;
monitoring differences between the actual compilation times and ideal compilation times of generating query execution plans for the plurality of incoming queries, wherein the ideal compilation times are estimated by assuming no query execution plan is evicted from the query execution plan cache; and
based on the monitored differences, dynamically adjusting the size of the query execution plan cache in runtime so that the size of the query execution plan cache varies during execution of the plurality of incoming queries;
wherein adjusting the size of the query execution plan cache comprises increasing the size of the query execution plan cache if the monitored differences have increased after executing a predetermined number of incoming queries and decreasing the size of the query execution plan cache if the monitored differences have remained flat after executing the predetermined number of incoming queries.

* * * * *